US007419047B2

(12) United States Patent
Cesselli et al.

(10) Patent No.: US 7,419,047 B2

(45) Date of Patent: Sep. 2, 2008

(54) BOARD LUMBER POSITION FENCE

(75) Inventors: Michael Derit Cesselli, Enderby (CA); Paul L. Halper, Enderby (CA)

(73) Assignee: Sec Sawmill Equipment Company Inc., Enderby, British Columbia (CA)

( * ) Notice: Subject to any disclaimer, the term of this patent is extended or adjusted under 35 U.S.C. 154(b) by 189 days.

(21) Appl. No.: 10/907,775

(22) Filed: Apr. 14, 2005

(65) Prior Publication Data

US 2006/0231370 A1 Oct. 19, 2006

(51) Int. Cl.
*B65G 47/34* (2006.01)

(52) U.S. Cl. .................. 198/597; 198/456; 198/457.01

(58) Field of Classification Search ................ 198/416, 198/597, 456, 457.01, 457.06, 457.07, 370.02, 198/370.07, 370.08
See application file for complete search history.

(56) References Cited

U.S. PATENT DOCUMENTS

| | | | | |
|---|---|---|---|---|
| 1,506,657 | A * | 8/1924 | Nordstrom et al. | 198/597 |
| 3,687,269 | A * | 8/1972 | Fritz et al. | 198/597 |
| 4,136,766 | A * | 1/1979 | Pryor et al. | 198/370.07 |
| 5,911,302 | A * | 6/1999 | Jackson | 198/456 |
| 6,382,067 | B1 * | 5/2002 | Gagnon | 198/456 |
| 6,892,614 | B2 * | 5/2005 | Olsen | 198/456 |
| 2002/0117377 | A1 * | 8/2002 | Newnes et al. | 198/456 |

* cited by examiner

*Primary Examiner*—James R Bidwell
(74) *Attorney, Agent, or Firm*—Daphne L. Maravei; Blake, Cassels & Graydon LLP

(57) ABSTRACT

Discloses a positioning fence for use in lumber saw mills that facilitates automated positioning of lumber for cutting. A continuous moving track loop has a plurality of paddles laterally positionable across the width of the track. Each paddle has a brake to hold the paddle in position. A positioning cam releases the brake to align each successive paddle to a desired lateral offset and a zeroing cam resets each paddle to a zero position.

8 Claims, 3 Drawing Sheets

BOARD LUMBER POSITION FENCE

FIELD OF THE INVENTION

This invention relates to woodworking machines and more particularly to a guide fence or stop for timber in sawmills or sawing machines.

BACKGROUND TO THE INVENTION

In sawmills various timber handling machinery is provided to cut and shape the timber into wood products such as veneers, board products and the like. In forming a board product, the tree or flitch material is cut to the desired cross section of the three dimensional shape desired for the lumber product being produced and the piece are then cut to length. When board lumber is handled within a mill, automation is generally provided throughout the mill to transport the material to be cut or worked within the sawmill. Frequently, the board lumber is transported from one work position to another on a flat bed roller system.

Once the flitch has been cut to the desired cross section, it is supplied to saw equipment for cutting to length. To cut the material to length, one arrangement of transport equipment has a conveyor that has a flat bed lug chain transport table to carry the lumber pieces toward the length cutting saws. The lumber pieces are carried along the conveyor in equidistantly spaced succession based on the lug spacing of the lug chains. The conveyor has a set of lateral alignment rollers. The lateral alignment rollers form a roller bed system placed at right angles to the lug chain, which operate to urge one end of the lumber material toward a stop or fence. In this arrangement, each successive piece of lumber is spaced from the other in the direction of travel along the lumber conveyor by the lugs of the lug chain and one of the ends of the lumber is laterally aligned to the stop or fence.

The piece to be cut to length is positioned for contact with a saw. In the configuration of sawmill conveyor equipment just described, the saw is stationary relative to the conveyor and the board is laterally positioned on the conveyor relative to the saw blade. A positioning fence, which one end of the lumber piece abuts against, controls the lateral position of the lumber piece on the feed conveyor. Numerous prior art arrangements for adjustable positioning fences for use with such a feed conveyor arrangement have been proposed in the past. For example a step positioning fence is disclosed in the published Canadian Patent application 2,241,481 of Wight et al. The stepped positioning fence of Wight has a plurality of rigid elevated faces, or steps that extend longitudinally along a side of the fence in an adjacent stepped array of differing offset spacing. The fence is oriented to present one of the steps for contact with the lumber piece to align the lumber end to the corresponding offset of that step. The lumber is urged into contact with the fence by the lateral alignment rollers resulting in alignment of the lumber end to the fence step offset. The stepped fence provides fixed incremental ending settings and a positioning mechanism to ensure the board is presented with a step suitable to obtain the desired or intended lateral translation of the board piece.

Another flexible trimmer position fence is disclosed in Canadian Patent 2,191,390 to Jackson, which discloses a board positioning fence comprised of a plurality of adjustable fence elements each staged one after the other in the downstream direction of travel of the lumber to be positioned. The lumber is urged against the positioning fence by lateral alignment or ending rollers. The ending rollers urge the lumber laterally across the feed conveyor into contact with the successive fence elements of the board positioning fence. When the desired lateral positioning of the board is achieved, lift skids are engaged to remove the lumber from contact with the lateral urging end rollers. This arrangement has multiple flexible fence elements, which are adjusted to allow the board to be ended to the desired positioning or ending location. Once the board has been displaced laterally to the desired position offset, skids are engaged that lift the positioned lumber piece away from the ending rollers.

Another arrangement to provide board lumber end positioning is disclosed in the Canadian patent 2,236,508 of Hannebauer et al. Hannebauer discloses a circulating paddle positioning fence with a flexible guide track. Actuators position the flexible guide track, which results in corresponding positioning of a paddle to a desired offset or ending position.

And yet another positioning mechanism is disclosed in the published Canadian Patent application 2,345,872 of Jobin, for apparatus for positioning pieces of wood for precise cutting. Jobin discloses an adjustable barrier, which is provided with actuators to position the barrier to the desired offset location. Various forms of adjustable barrier are shown including ones which have a face that remains perpendicular to the board as well as providing for incline planes that have a set displacement selected by an actuator to achieve an ending or offset of the lumber laterally to the desired offset amount.

SUMMARY OF THE INVENTION

The present invention provides a board positioning fence that includes individual paddles displaced along a continuous track loop at a spacing corresponding to the spacing of the lumber to be positioned or ended. The paddles are laterally displacable across the width of the track and include a brake to lock the paddle from lateral movement. When lateral adjustment is desired, a positioning cam engages the paddle to release the paddle brake allowing the released paddle travels across the track long a bearing. When the desired lateral offset amount is achieved, the positioning cam is disengaged from the paddle allowing the brake to halt further lateral displacement of the lumber in the feed assembly. A reset cam returns the paddles to a zero position on the return travel of the track loop.

A preferred embodiment of the invention will now be described with reference to the accompanying drawings in which like features of the invention are depicted by the same reference numerals throughout the various figures of the drawings.

DETAILED DESCRIPTION OF THE PREFERRED EMBODIMENT

Figure 1:
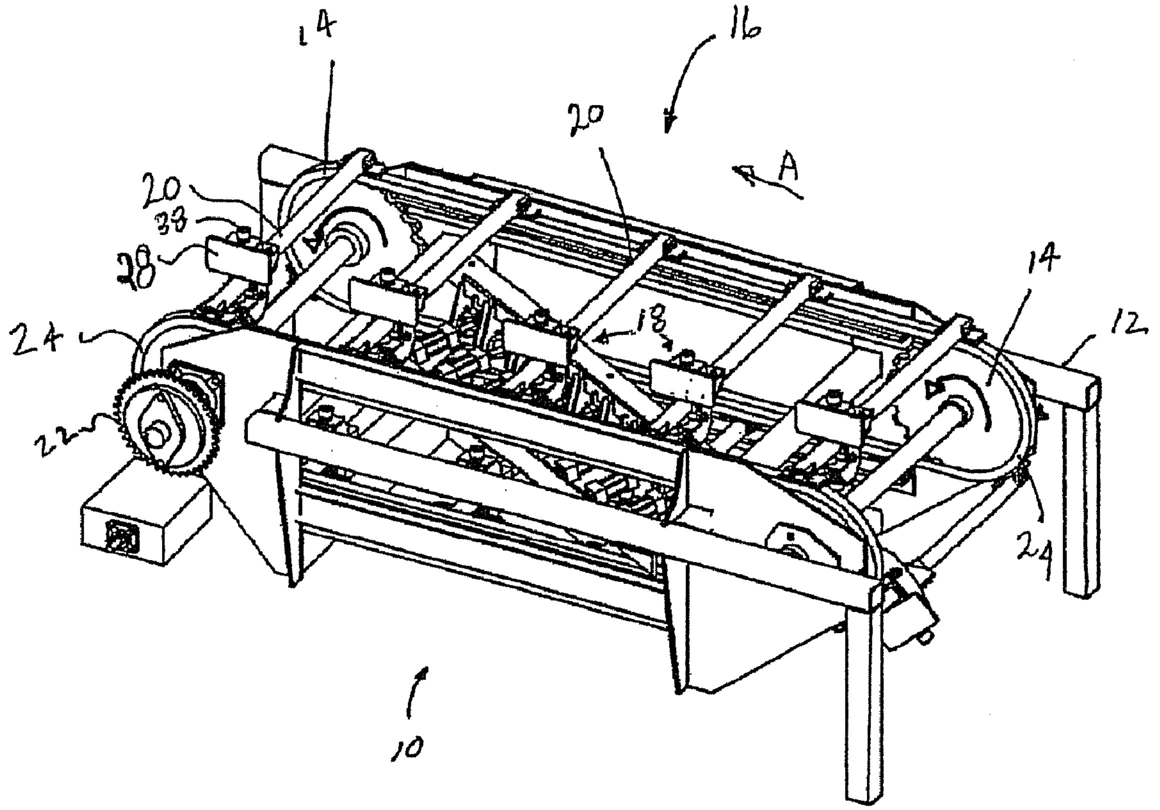
FIG. 1 is perspective view of a preferred embodiment of the positioning fence.

FIG. 1 shows a perspective view of a preferred embodiment of the positioning fence of the present invention, generally depicted by reference numeral 10. The positioning fence has a continuous track loop 16 extending between an opposed set of end rollers 14 supported by a frame assembly 12. The track includes a plurality of paddles 18 spaced along the continuous track loop 16 corresponding to the lumber spacing of the individual board pieces that the board lumber position fence will be used to position. Each of the paddles 18 is mounted for lateral sliding movement across the width of the track loop along a bearing way 20. The bearing way 20 is oriented for lateral movement of the paddle, which is the direction of movement that the lumber will move when positioned or ended using the board lumber position fence. One of end rollers 14 is driven to cause paddles 18 to move transversely, that is in the direction of travel of the lumber, which is generally depicted by arrow A. Suitable means to provide drive to an end roller includes a sprocket assembly 22 for chain coupling to a torque source, such as a drive motor or the lumber transport system that the position fence operates with or other equipment in the saw mill. To construct the continuous loop track 16, each end of bearing way 20 is coupled to a flexible web 24 extending between each of the end rollers 14. Flexible web 24 is constructed from a belt or a chain. In this manner, the paddles 18 of the continuous track are driven in the direction of arrow A.

Figure 2:
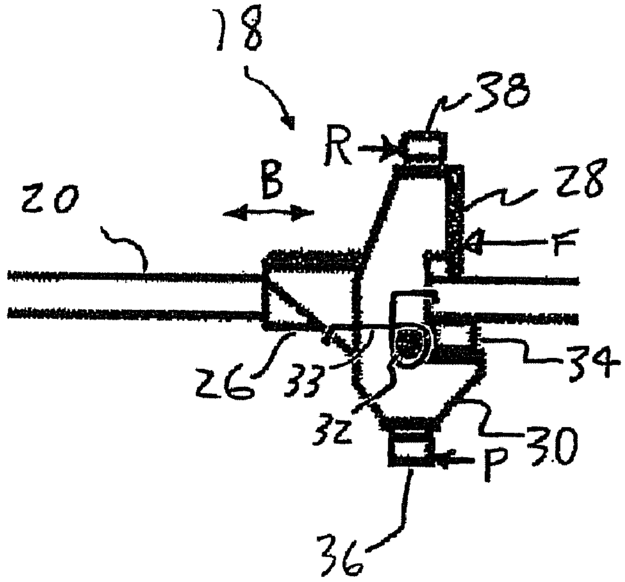
FIG. 2 is an elevation view of a paddle assembly of FIG. 1.

FIG. 2 shows a side elevation view of a preferred embodiment of a paddle assembly constructed in accordance with the principles of the invention, generally depicted by reference numeral 18. The paddle assembly 18 has a bearing 26 that is slidably mounted on bearing way 20. The sliding engagement between bearing 26 and bearing way 20 permits lateral movement of the paddle assembly 18 along bearing way 20 in the directions shown by double headed arrow B. A paddle lumber seat 28 provides a surface on which the lumber piece to be positioned rests. A pivot arm 30 interconnects the paddle lumber seat 28 with bearing 26 at pivot 32. A brake 34 prevents movement of the paddle assembly 18 along bearing way 20 when a lumber piece rests on the paddle lumber seat 28. A force “F” applied to the paddle lumber seat 28 and/or a biasing means 33, such as a spring, rotates pivot arm 30 around pivot 32 urging brake 34 into contact with bearing way 20 thus preventing sliding lateral movement of the paddle assembly 18 along bearing way 20. Brake 34 is constructed from a suitable friction material such as for example polyurethane.

Each paddle assembly includes cam followers to effect movement and positioning of the paddle assembly 18 along bearing way 20. A positioning cam follower 36 is used to urge the paddle assembly 18 in a right-to-left direction along bearing way 20 and a reset cam follower 38 is used to urge paddle assembly 18 in the opposite direction, that is, in a left-to-right direction. Engagement of cam followers 36 or 38 releases the brake 34. For example, when a cam contacts the positioning cam follower 36 in the direction of arrow “P”, pivot arm 30 rotates to release brake 34 allowing the cam to move the paddle assembly to the left. Similarly, when a cam contacts the reset cam follower 38 in the direction of arrow “R”, pivot arm 30 rotates to release brake 34 allowing the cam to move the paddle assembly to the right. Consequently cam followers 36 and 38 are used to position the paddle assembly 18 at a desired location on bearing way 20.

Figure 3:
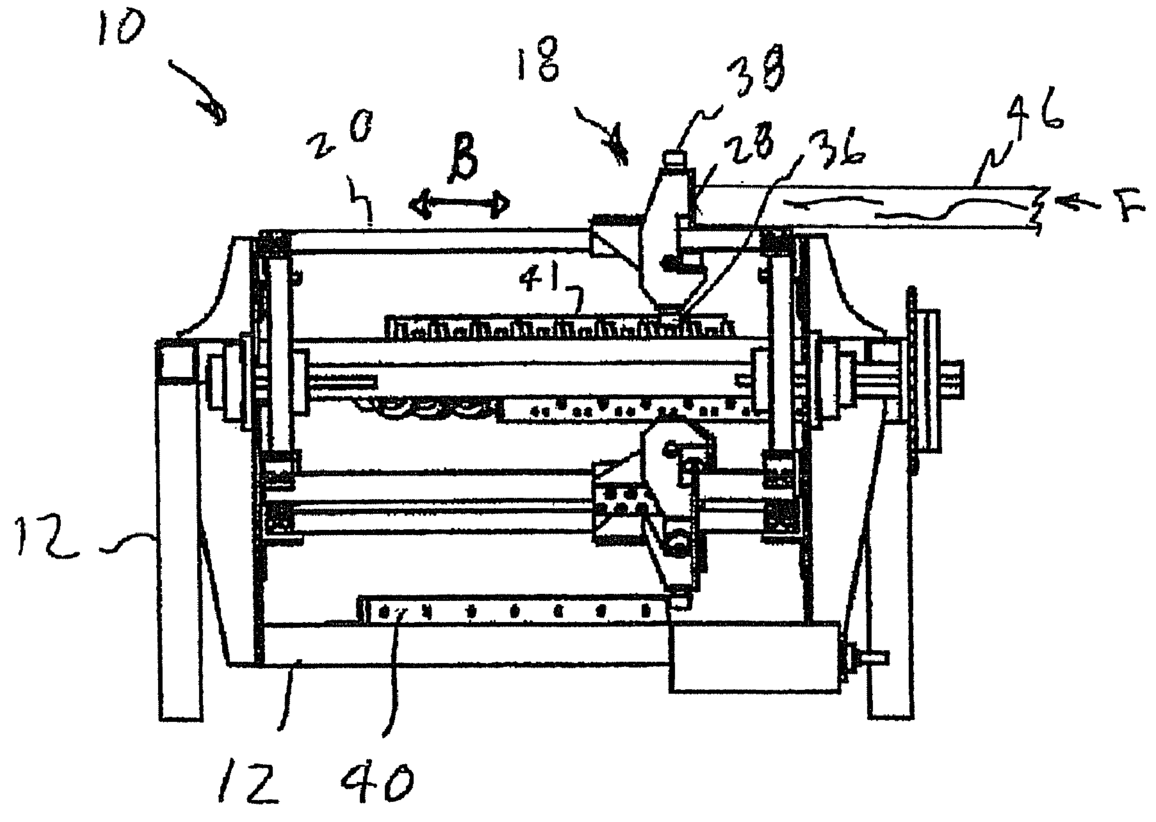
FIG. 3 is an end view of the positioning fence of FIG. 1.

FIG. 3 is an end view of a preferred embodiment of the board lumber position fence assembly 10. A reset or zeroing cam 40 is coupled to the frame assembly 12 of the board lumber position fence. Reset cam 40 is provided for contact with the reset cam follower 38 of each paddle assembly and is used to urge each successive paddle assembly 18 that passes along it back into a zero or reset position. The zero or reset position is the position of the paddle assembly in the right most location along each respective bearing way 20. When the paddle assembly is in the zero or reset position it can traverse in a right-to-left fashion to the other end of the bearing way as required to end or provide a lateral position to a board lumber piece.

A positioning cam 41 is provided on the opposite paddle travel side of the track, that is in the upper area of the board lumber position fence. The positioning cam is moveable between a released position or a locked position. When the positioning cam segment is in the released position, it is oriented to engage the lower cam follower 36 of each successive paddle assembly 18 passing along it. When the positioning cam 41 is in the released position, it comes into contact with the positioning cam follower 36 of a paddle assembly 18 and the paddle assembly is freed to move in a right-to-left direction along bearing way 20. In operation of the lumber positioning fence, a lumber piece 46 is seated on the paddle lumber seat 28 and is urged in the direction of arrow “F”. Thus when the positioning cam 41 is oriented into released position as shown in FIG. 3, it comes in contact with the position cam follower 36 and the paddle assembly 18 is freed to move in a right-to-left direction. Consequently, lumber piece 46 will then move in the direction of arrow “F” until the positioning cam 41 is oriented into a locked position, which causes the paddle assembly 18 to lock in that lateral position or location. Thus, when the desired offset or lateral displacement of the lumber piece 46 seated on paddle assembly 18 is achieved, the positioning cam 41 is actuated to release it from contact with lower cam follower 36, thereby causing the paddle assembly 18 to lock in that location.

Figure 4:
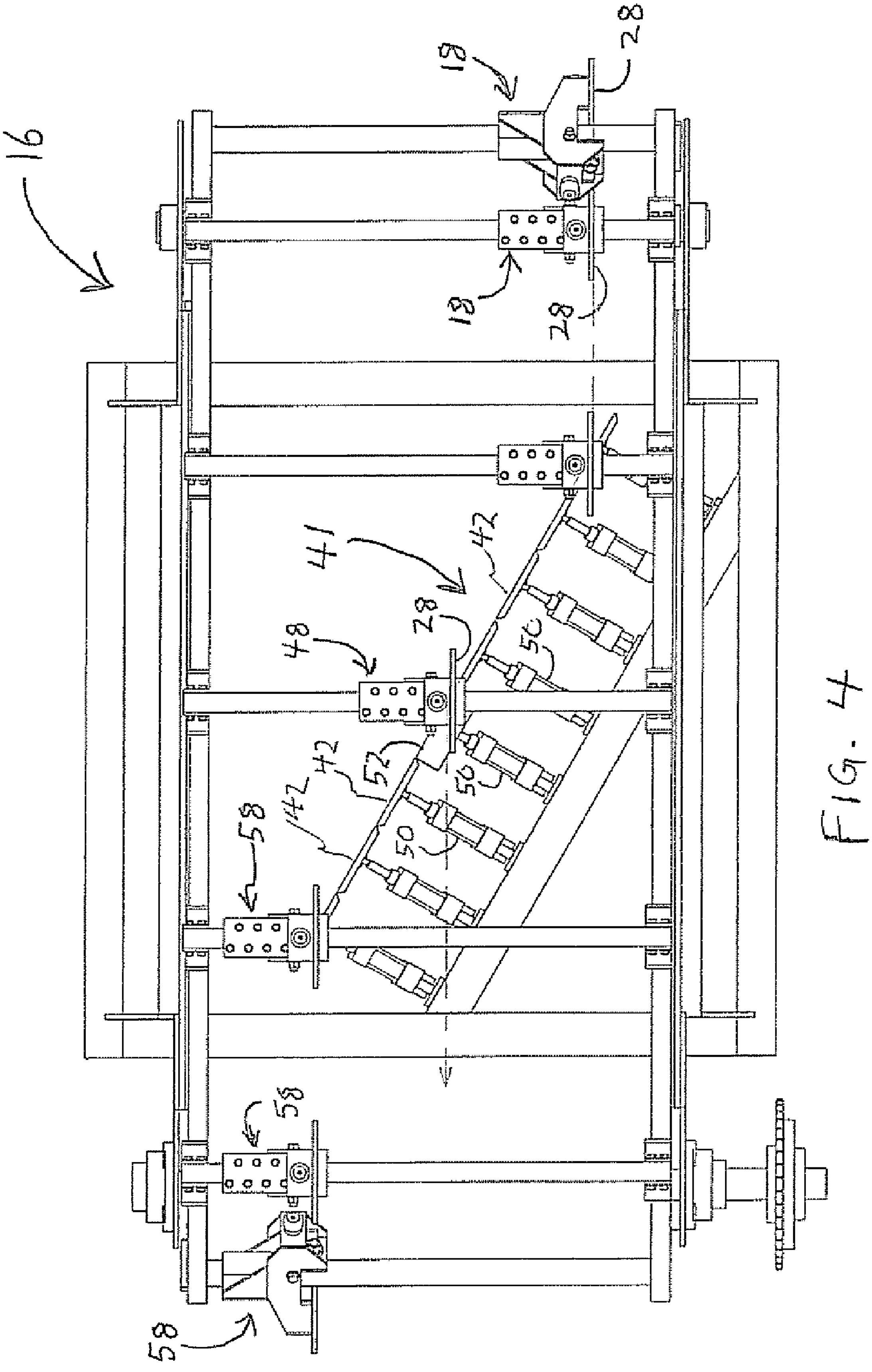
FIG. 4 is a plan view of the positioning fence of FIG. 1.

FIG. 4 shows a top plan view of the board lumber position fence giving another view of the cam assemblies in accordance with the present invention. The zeroing cam, shown as 40 only in FIG. 3, is at the bottom of the track loop 16 and is positioned at an angle to the direction of travel of the paddles 18 mounted on the continuous track loop 16. As the paddles 18 travel past the zeroing cam, they are urged to return to the zero position, which is the position of the 3 right-most paddles in the drawing. There is shown one offset paddle 48 and three other paddles 58 with a different offset. Also visible in the drawing is the positioning cam 41, which is set at an angle to the direction of travel of the paddles 18. The positioning cam 41 is made of segments that are orientable between a released position, which effects lateral movement of each paddle 18 passing therealong, and a locked position, where no lateral movement of a passing paddle 18 occurs.

Preferably, the positioning cam 41 is constructed from a plurality of positioning cam segments, each segment being orientable between a released position shown in FIG. 4 by several cam segments 42, and a locked position shown for one cam segment 52. An actuator 50 orients a corresponding respective positioning cam segment between the released orientation of cam segments 42 and the locked orientation shown for one cam segment 52. The positioning cam is preferably provided in segments each with its own respective actuator 50 to facilitate separate control of each individual paddle 18 even with a shallow cam angle and close spacing of the paddles 18 along track 16. Therefore, cam segments on the positioning cam permit gradual lateral adjustment of the lumber pieces, even with a close spacing of the paddle/lumber piece along the length of the continuous track loop 16.

The locked orientation of cam segment 52 illustrates operation of the positioning fence. As the displaced or offset paddle 48 passed along the positioning cam 41, contact of that paddle’s lower cam follower with the segments of the positioning cam allowed the board lumber piece (not shown) which would be in contact with paddle lumber seat 28 of paddle 48 and extending downward in the drawing to move laterally and be positioned at an off set from the zero position. When the board lumber piece reaches the desired offset amount, the positioning cam segment was actuated away from contact with the cam follower of the associated paddle, causing the paddle brake to lock, thereby halting further lateral displacement of the lumber piece.

Now that the invention has been described numerous variations, substitutions and equivalents will come to the mind of those skilled in the art. The invention, is not however, limited to the specific embodiments described herein with reference to the attached drawings, but rather, the scope of the invention is defined by the claims appended hereto.

What is claimed is:

1. An apparatus for positioning lumber pieces comprising:

i) a length of continuous track loop to translate lumber pieces to be positioned operable for movement in a direction along its length, said pieces moving in a direction generally perpendicular to their longitudinal direction along said track loop;

ii) a plurality of paddles spacedly disposed along the length of the continuous track loop, each of said paddles slideably mounted along bearing ways coupled to said track loop, and wherein each of said paddles form a lumber seat for contacting an end of a lumber piece, each of said paddles being laterally displaceable across a width of the track loop;

iii) brake means operable to lock the lateral position of each of said paddles; and iv) a positioning cam for controlling the brake means to position the paddle and activateable between a locked position preventing lateral movement of the paddle lumber seat and a released position allowing lateral movement of the paddle lumber seat.

2. The apparatus of claim 1 further including biasing means to urge said brake means to lock the lateral position of the paddle.

3. The apparatus of claim 1 further including a reset cam to displace the lumber seat of each paddle into a zero lateral position.

4. The apparatus of claim 1 wherein each paddle includes a positioning cam follower to engage said positioning cam when in the released position and effect release of said brake means to displace the paddle laterally.

5. The apparatus of claim 1 wherein each paddle includes a reset cam follower to engage said reset cam and effect release of said brake means to displace the paddle laterally.

6. The apparatus of claim 1 further including actuator means to move the positioning cam between the locked position and the released position.

7. The apparatus of claim 1 wherein said positioning cam is comprised of a plurality of segments, each said segment activateable between a locked position preventing lateral movement of the paddle lumber seat and a released position allowing lateral movement of the paddle lumber seat.

8. The apparatus of claim 7 further including actuator means for each positioning cam segment to move the positioning cam segment between the locked position and the released position.

* * * * *